(12) United States Patent
Sharma et al.

(10) Patent No.: US 12,717,913 B2
(45) Date of Patent: Aug. 25, 2026

(54) SYSTEM AND METHOD FOR PERFORMING ANTIVIRUS SCAN OF A VIRTUAL MACHINE

(71) Applicant: Druva Inc., Santa Clara, CA (US)

(72) Inventors: Rakesh Sharma, Gwalior (IN); Uday Sanjay Swami, Pune (IN); Ravi Chandraprakash Somani, Kolhapur (IN)

(73) Assignee: DRUVA INC., Santa Clara, CA (US)

( * ) Notice: Subject to any disclaimer, the term of this patent is extended or adjusted under 35 U.S.C. 154(b) by 101 days.

(21) Appl. No.: 18/731,879

(22) Filed: Jun. 3, 2024

(65) Prior Publication Data

US 2025/0272399 A1 Aug. 28, 2025

(30) Foreign Application Priority Data

Feb. 24, 2024 (IN) ............................ 202441013405

(51) Int. Cl.
*G06F 21/56* (2013.01)
*G06F 9/455* (2018.01)

(52) U.S. Cl.
CPC ............ *G06F 21/56* (2013.01); *G06F 21/564* (2013.01); *G06F 21/565* (2013.01); *G06F 2009/45587* (2013.01)

(58) Field of Classification Search
CPC ................ G06F 21/565; G06F 21/564; G06F 2009/45587
See application file for complete search history.

(56) References Cited

U.S. PATENT DOCUMENTS 9,268,689 B1 * 2/2016 Chen ...................... G06F 21/53
11,372,811 B1 * 6/2022 Ciubotariu ........... G06F 21/565
(Continued)

*Primary Examiner* — Robert B Leung
(74) *Attorney, Agent, or Firm* — Vorys, Sater, Seymour and Pease LLP

(57) ABSTRACT

A system for performing an antivirus scan of backup snapshots of a virtual machine is provided. The system includes a memory storing one or more processor-executable routines and a processor communicatively coupled to the memory. The processor is configured to execute the one or more processor-executable routines to access a plurality of backup snapshots of the virtual machine and perform a complete antivirus scan of one or more snapshots to identify a reference snapshot. The reference snapshot includes one or more malicious files. The processor is further configured to compare file system metadata of a first snapshot with respective file system metadata of the reference snapshot to identify files that have changed between the first and reference snapshots and perform the antivirus scan of the identified changed files to detect one or more malicious files and to generate an updated list of the malicious files. The processor is further configured to access a second snapshot and the updated list of malicious files with corresponding metadata of the files and perform first, second and third screenings of the second snapshot to detect an infected snapshot. The processor is further configured to compare disk offsets and checksum of corresponding data at the disk offsets, metadata and file checksum respectively of the malicious files with corresponding files of the second snapshot to perform the first, second and third screenings in a sequential manner. The processor is further configured to repeat the first, second and third screenings for the plurality of backup snapshots of the virtual machine.

20 Claims, 6 Drawing Sheets

(56) References Cited

U.S. PATENT DOCUMENTS

| | | | | |
|---|---|---|---|---|
| 2006/0136720 | A1* | 6/2006 | Armstrong | G06F 21/566 713/164 |
| 2008/0263658 | A1* | 10/2008 | Michael | G06F 21/562 726/22 |
| 2009/0007100 | A1* | 1/2009 | Field | G06F 21/566 718/1 |
| 2023/0376605 | A1* | 11/2023 | Maheshwari | G06F 21/577 |
| 2025/0036762 | A1* | 1/2025 | Nanivadekar | G06F 21/565 |

* cited by examiner

SYSTEM AND METHOD FOR PERFORMING ANTIVIRUS SCAN OF A VIRTUAL MACHINE

PRIORITY STATEMENT

The present application claims priority under 35 U.S.C. § 119 to Indian patent application Ser. No. 202441013405 filed 24 Feb. 2024 the entire contents of which are hereby incorporated herein by reference.

BACKGROUND

The invention generally relates to the field of virtual machines and more particularly, to a system and method for performing antivirus scan of a virtual machine.

Virtual machines may be susceptible to various types of virus attacks. A virus may be a program that attaches to other programs of objects of the virtual machine. The virus may perform malicious or unsolicited actions on the machine thereby damaging computing resources. Further, once a program is infected with a virus, the virus can spread each time the program is executed. Allowing viruses to stay undetected in a virtual machine can cause unexpected harmful results, such as deletion of files, alteration of system settings and consummation of network bandwidth and system resources, which results in poor performance.

Regular antivirus scans of the virtual machine may be recommended to avoid aforementioned damage. Existing techniques perform virus scans at a storage device level that stores one or more virtual machine disk image files (VMDK). Typically, an antivirus scan module communicates between a file system on the storage device, a file system (FS) decoder, and an antivirus engine to perform a virus scan of files contained within the VMDK file. The antivirus scan module provides the file system addresses of subset of files to an antivirus engine, which then performs the antivirus scan on the files.

A drawback of aforementioned technique is that, in order to perform the antivirus scan according to existing methods, the file system needs to be mounted that can be very time consuming. As a result, the existing antivirus scan methods are slow and are inefficient, especially when the backup snapshots are stored on a remote storage such a cloud. Downloading the entire disk for mounting the filesystem can be inefficient. Hence there is a need for a system and method, for performing antivirus scans of a virtual machine. Accordingly, am improved method and system for performing antivirus scans is proposed.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, a system for performing an antivirus scan of backup snapshots of a virtual machine is provided. The system includes a memory storing one or more processor-executable routines and a processor communicatively coupled to the memory. The processor is configured to execute the one or more processor-executable routines to access a plurality of backup snapshots of the virtual machine and perform a complete antivirus scan of one or more snapshots to identify a reference snapshot. The reference snapshot includes one or more malicious files. The processor is further configured to compare file system metadata of a first snapshot with respective file system metadata of the reference snapshot to identify files that have changed between the first and reference snapshots and perform the antivirus scan of the identified changed files to detect one or more malicious files and to generate an updated list of the malicious files. The processor is further configured to access a second snapshot and the updated list of malicious files with corresponding metadata of the files and perform first, second and third screenings of the second snapshot to detect an infected snapshot. The processor is further configured to compare disk offsets and checksum of corresponding data at the disk offsets, metadata and file checksum respectively of the malicious files with corresponding files of the second snapshot to perform the first, second and third screenings in a sequential manner. The processor is further configured to repeat the first, second and third screenings for the plurality of backup snapshots of the virtual machine.

According to another example embodiment, a system for performing an antivirus scan of backup snapshots of a virtual machine is provided. The system includes a memory storing one or more processor-executable routines and a processor communicatively coupled to the memory. The processor is configured to execute the one or more processor-executable routines to access a plurality of backup snapshots of the virtual machine and access a current snapshot and a list of malicious files with corresponding metadata of the files. The processor is further configured to perform first, second and third screenings of the current snapshot to detect an infected snapshot. The processor is further configured to compare disk offsets and checksum of corresponding data at disk offsets, metadata and file checksum respectively of the malicious files with corresponding files of the current snapshot to perform the first, second and third screenings in a sequential manner. The processor is further configured to repeat the first, second and third screenings for the plurality of backup snapshots of the virtual machine.

According to another example embodiment, a method for performing an antivirus scan of backup snapshots of a virtual machine is disclosed. The method includes accessing a plurality of backup snapshots of the virtual machine and performing a complete antivirus scan of one or more snapshots to identify a reference snapshot. The reference snapshot includes one or more malicious files. The method further includes comparing file system metadata of a first snapshot with respective file system metadata of the reference snapshot to identify files that have changed between the first and reference snapshots and performing the antivirus scan of the identified changed files to detect one or more malicious files and to generate an updated list of the malicious files. The method further includes accessing a second snapshot and the updated list of malicious files with corresponding metadata of the files and performing first, second and third screenings of the second snapshot to detect an infected snapshot. The first, second and third screenings include comparing disk offsets and checksum of corresponding data at disk offsets, metadata and file checksum respectively of the malicious files with corresponding files of the second snapshot. The first, second and third screenings are performed in a sequential manner. The method includes repeating the first, second and third screenings for the plurality of backup snapshots of the virtual machine.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Figure 1:
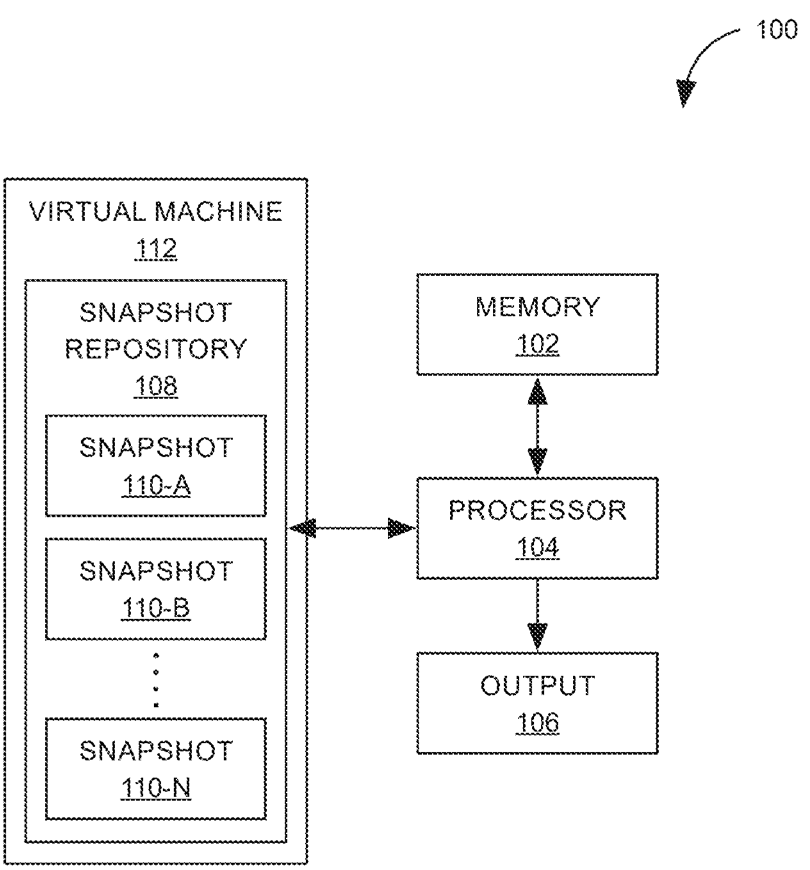
FIG. 1 is a block diagram of a system for performing anti-virus scans on snapshots of a virtual machine, according to some aspects of the present description.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein. On the contrary, example embodiments are to cover all modifications, equivalents, and alternatives thereof.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed but may also have additional steps not included in the figures. It should also be noted that in some alternative implementations, the functions/acts/steps noted may occur out of the order noted in the figures. For example, two figures shown in succession may, in fact, be executed substantially concurrently or may sometimes be executed in the reverse order, depending upon the functionality/acts involved.

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or a section. Thus, a first element, component, region, layer, or section discussed below could be termed a second element, component, region, layer, or section without departing from the scope of example embodiments.

Spatial and functional relationships between elements (for example, between modules) are described using various terms, including "connected," "engaged," "interfaced," and "coupled." Unless explicitly described as being "direct," when a relationship between first and second elements is described in the description below, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless specifically stated otherwise, or as is apparent from the description, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments of the present invention provide systems and methods for performing anti-virus scan on a virtual machine.

FIG. 1 is a block diagram of a system 100 for performing anti-virus scans on snapshots of a virtual machine 112. The system 100 includes a memory 102, a processor 104 and an output 106. The memory 102 stores one or more processor-executable instructions, and the processor 104 is communicatively coupled to the memory 102 to execute one or more processor-executable routines. The output 106 may be a display or a monitor that provides an output of the devices such as displaying details of malicious files detected for the virtual machine 112. The virtual machine 112 may include a snapshot repository 108 that includes a plurality of snapshots such as represented by reference numerals 110*a*-110*n*.

The processor 104, is configured to access a plurality of backup snapshots (e.g., snapshots 110*a*-110*n*) of the virtual machine 112. The virtual machine 112 may be hosted on a disk. The processor 104, performs a first, second and third screenings of the plurality of backup snapshots in a sequential manner, to detect one or more malicious files present in the virtual machine 112. In this embodiment, the first, second and third screenings of the virtual machine 112 include comparing disk offsets and checksum of corresponding data at the disk offsets, metadata and file checksum, respectively of one or more consecutive backup snapshots. The first, second and third screenings are repeated for the plurality of backup snapshots 110*a*-110*n*.

In an embodiment, the processor 104 is configured to scan a first backup snapshot of a virtual machine hosted on a disk to detect a malicious file. The processor 104, then accesses the file information of the detected malicious file. The file information includes a disk offsets, and checksum of corresponding data at the disk offsets, metadata and file checksum respectively of the malicious file. The processor 104 is configured to compare the disk offsets and checksum of corresponding data at the disk offsets of the malicious file against a current backup snapshot of the virtual machine to perform the first screening of the subsequent backup snapshots. The processor 104, then marks the current backup snapshot as infected with the malicious file if a match is detected for the disk offset and checksum.

The second screening is performed if the current backup snapshot is detected to be uninfected with the malicious file. The processor 104, compares the metadata of the infected files (e.g. mtime, atime, permissions and the like) of the current backup snapshot with the corresponding metadata of the malicious files, and marks the current backup snapshot as being infected with the malicious file if a match is detected between metadata of the first and second backup snapshots.

The processor 104, is further configured to perform the third screening of the backup snapshots, if the current backup snapshot is detected to be uninfected with the malicious file in the second screening. In this embodiment, the processor is configured to compare the file checksum of the malicious files against corresponding files of the current backup snapshot and mark the current backup snapshot as being infected with the malicious file, if a match is detected.

The processor 104, is further configured to access metadata corresponding to two consecutive backup snapshots, compare the metadata corresponding to the two consecutive backup snapshots to identify one or more files that have changed between the two snapshots. In addition, the processor 104 is configured to scan the identified one or more files to identify one or more malicious files. Generally, the one or more malicious files are different from the files identified in the first, second and third screenings.

In another embodiment, the system 100, is configured to perform screenings as explained hereinbelow. The processor 104, is configured to perform a scan on a complete virtual machine snapshot of the machine to detect a reference snapshot with one or more malicious files. As used herein, the term "reference snapshot" refers to a snapshot on which a full antivirus scan has been performed. Further, the processor is configured to compare file system of the reference snapshot with subsequent snapshots to generate an updated malicious files list.

In addition, the processor 104, is further configured to perform the first, second and third screenings for the snapshots using the updated malicious files list and their associated metadata.

The system is configured to substantially reduce number of full antivirus scans of the backup snapshots to determine the malicious files. A detailed process flow of performing the antivirus scans using first, second and third screenings is explained with reference to FIGS. 2-5.

Figure 2:
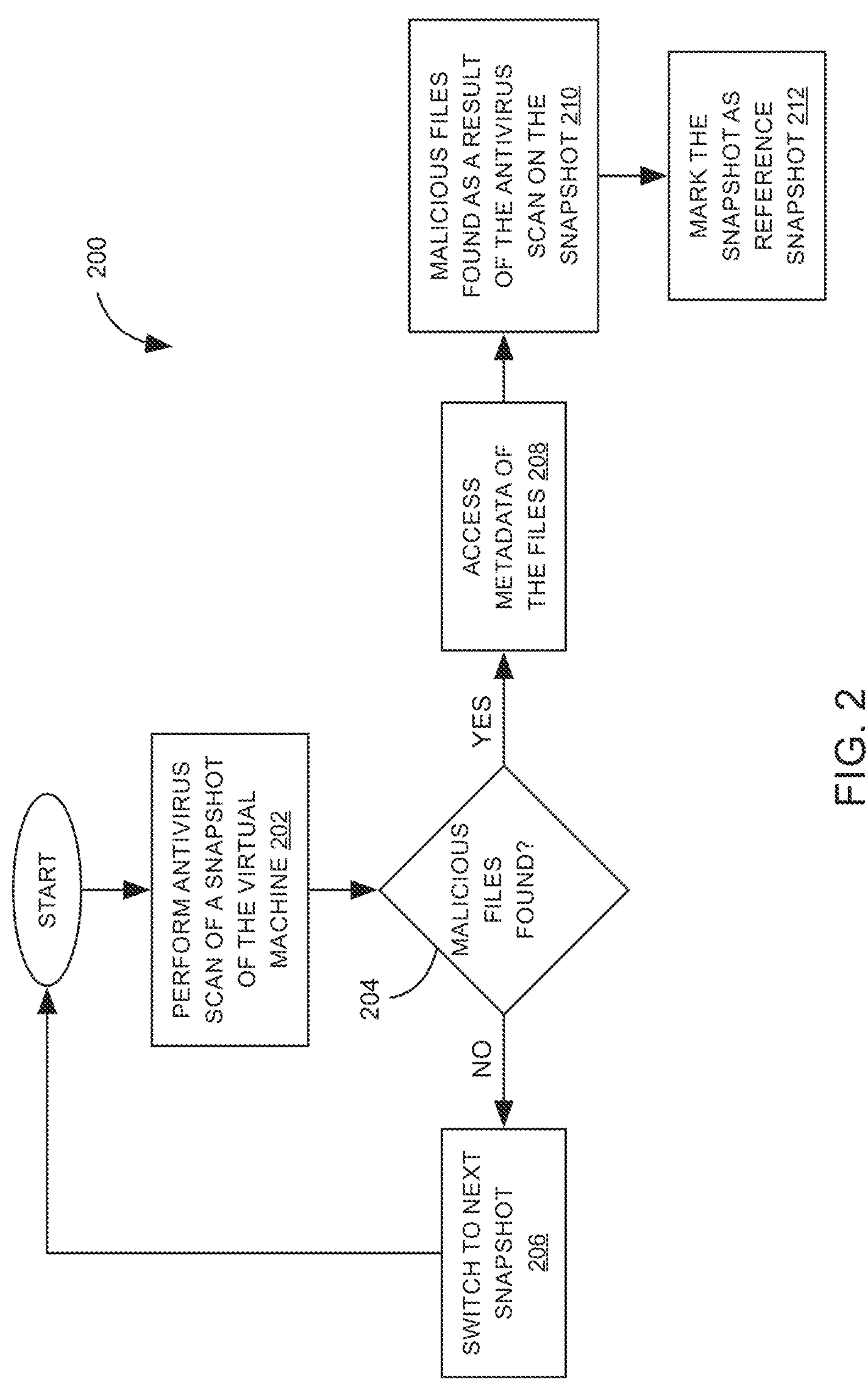
FIG. 2 illustrates an embodiment of an example workflow for performing an antivirus scan using the system of FIG. 1, according to some aspects of the present description.

FIG. 2 illustrates an embodiment of an example workflow 200 for performing an antivirus scan using the system 100 of FIG. 1. In this example, the system 100 is configured to perform a scan on a complete virtual machine snapshot of the machine 112. At block 202, an antivirus scan of a snapshot (e.g., 110 A) of the virtual machine 112 is performed. Further, it is determined if there are any malicious files in the snapshot (block 204). If no malicious file is detected in the snapshot, a scan of the next snapshot (e.g., 110 B) is performed (block 206).

Alternately, if malicious files are detected in the snapshot, metadata of the files is accessed at block 208 to determine the malicious files of the snapshot (block 210). Such snapshot is marked as a reference snapshot at block 212. As used herein, the term "reference snapshot" refers to a snapshot for which a complete list of malicious files is known.

Figure 3:
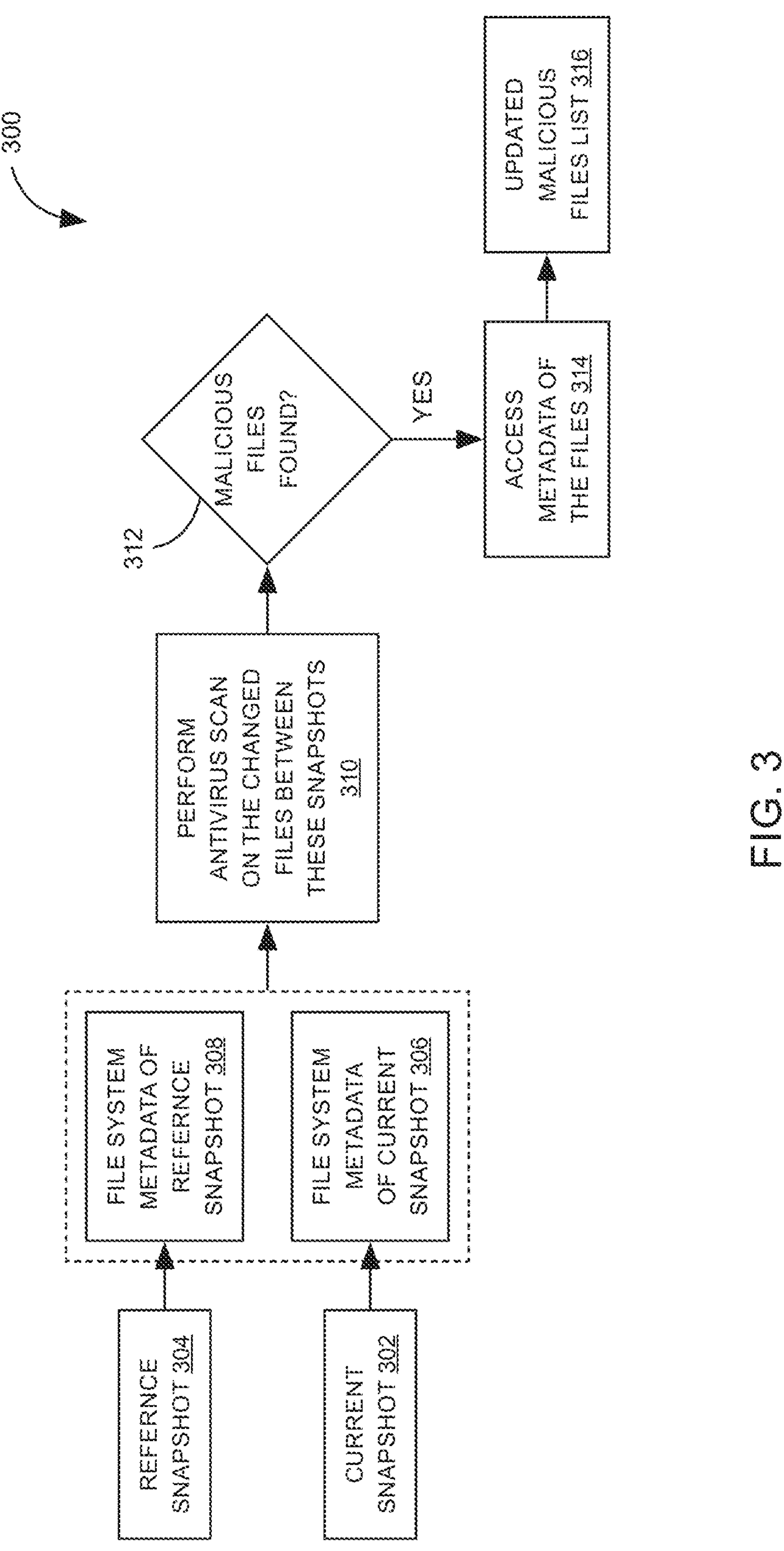
FIG. 3 illustrates another example workflow for performing an antivirus scan using the system of FIG. 1.

FIG. 3 illustrates another example workflow 300 for performing an antivirus scan using the system 100 of FIG. 1. In this example, a current snapshot 302 of the virtual machine 112 is compared with a reference snapshot 304 such as determined in block 212 of process of FIG. 2. In particular, file system metadata of the current snapshot 302 is compared with respective file system metadata of the reference snapshot 304 (blocks 306 and 308) to determined changed files between the current and reference snapshots 302 and 304.

Further, at block 310, an antivirus scan is performed on the changed files between the current and reference snapshots 302 and 304 to determine any malicious files (block 312). If one or more malicious files are detected, metadata of the files is accessed at block 314 and the updated malicious files list is generated (block 316).

Figure 4:
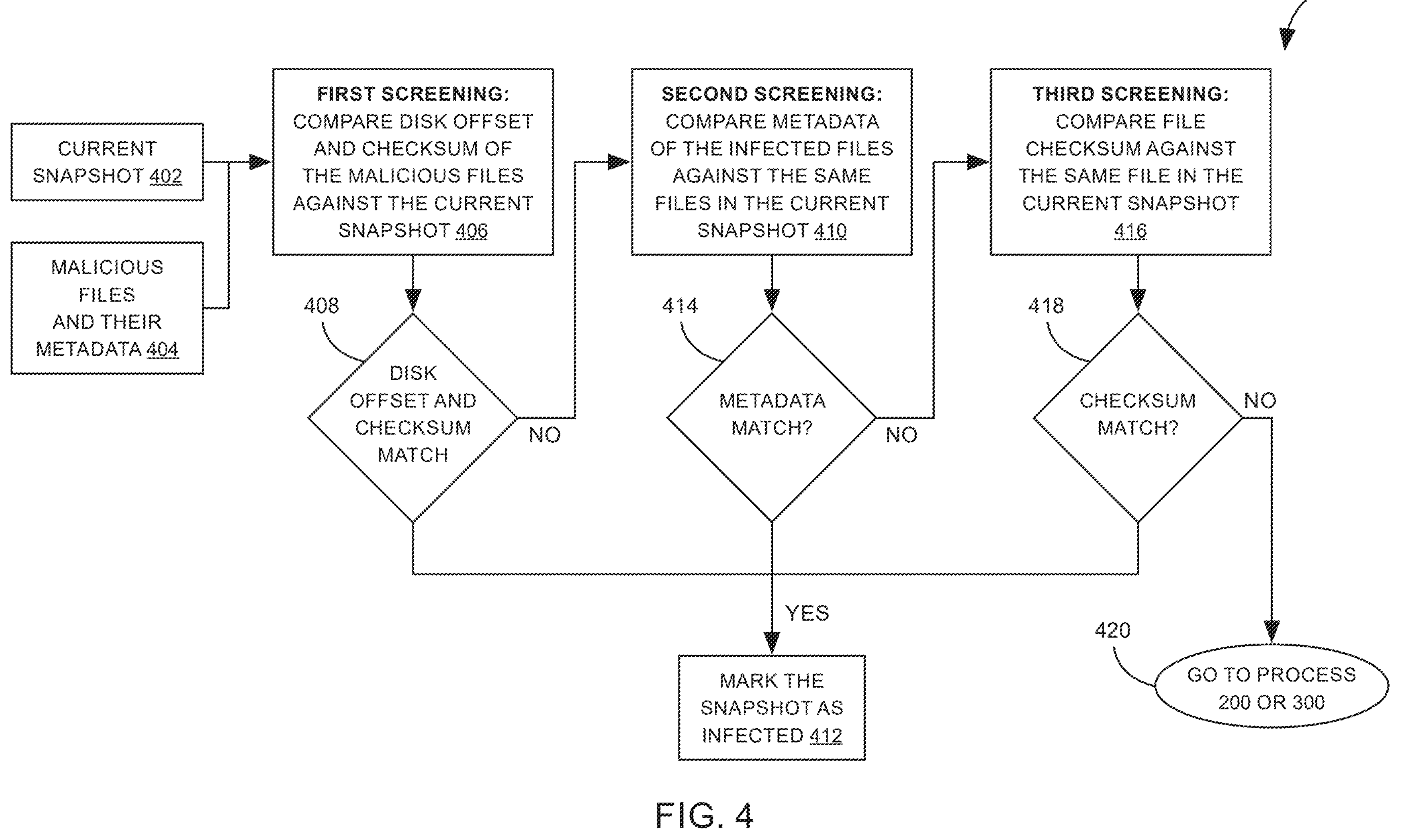
FIG. 4 illustrates a process flow for performing an anti-virus scan of a virtual machine, according to some aspects of the present description.

FIG. 4 illustrates a process flow 400 for performing an antivirus scan of a virtual machine, according to some aspects of the present description. As illustrated, at blocks 402 and 404, a current snapshot and information about malicious files and their metadata are provided to the system 100.

The process then flows to block 406, where a first screening is performed by comparing disk offsets and checksum of the malicious files against the current snapshot. The process then flows to block 408, where a decision is made based on a match found between the disk offsets and the checksums. In case the disk offset and the checksums of do not match then the process flows to block 410. Further, if there is match of disk offsets and the checksums the snapshot is marked as infected (block 412).

At block 410, the processor performs a second screening where the metadata of the infected files is compared with the respective files in the current snapshot 402. The process then flows to block 414, where a decision is made based on a match found between the metadata of the two snapshots. In case a match is detected, then the process flows to the block 412, where the snapshot is marked as infected. However, in case the metadata does not match the process flows to block 416.

At block 416, a third screening is performed where the file checksum is compared with the file checksum of the respective file in the current snapshot. The process then flows to block 418, where a decision is made based on a match found between the file checksums of the two snapshots. In case the file checksum match is detected, then the process flows to block 412, where the snapshot is marked as infected. However, if file checksums do not match the process flows to block 420, where another scan such as described in FIG. 2 and FIG. 3 is performed on the snapshot.

It is pertinent to note, that in an event where the file checksums do not match, it cannot be concluded that the backup snapshot is safe. For all such snapshots, the process described above will be required to be repeated. In an embodiment, once all the three screenings or passes are performed, a conclusion of whether the backup snapshot is infected or not can be safely reached. For determining a file's metadata and data blocks (offset, length) pair, a File System implementation using FUSE, NBD, ISCSI, or similar technologies may be employed. In another embodiment, a fourth screening is performed after the third screening is completed. This embodiment, is explained with reference to FIG. 3.

Figure 5:
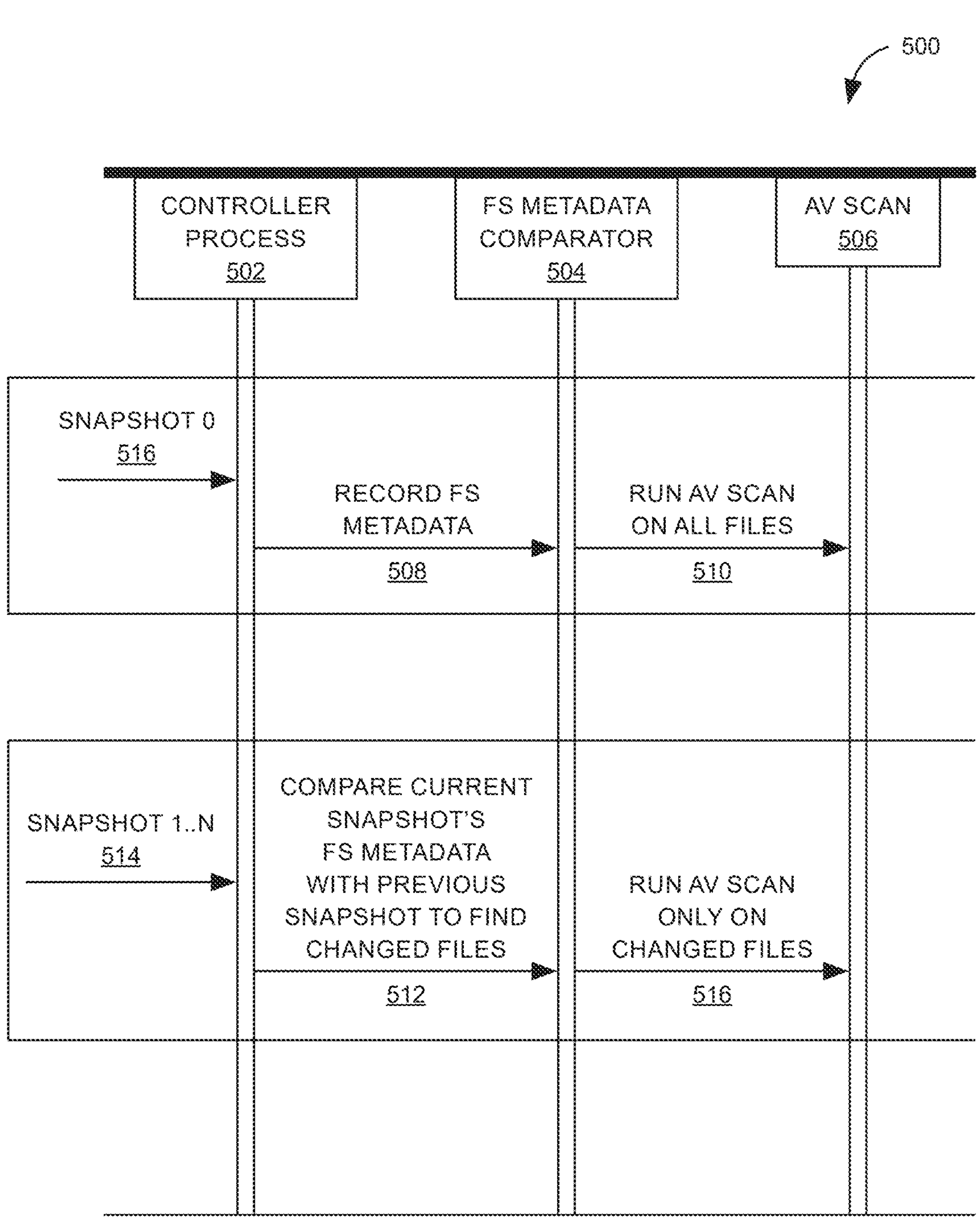
FIG. 5 illustrates a flow diagram, of another example screening process is performed by the system of FIG. 1

FIG. 5 illustrates a flow diagram 500, of another example screening process is performed by the system 100 of FIG. 1. In this example, a fourth screening is performed only to filter the files that are scanned from snapshot-to-snapshot. FIG. 5, shows a controller process 502, a FS metadata comparator process 504, and a AV scan 506. At 508, FS metadata of snapshot 0 (516) that is fetched by the controller process is recorded. At 510, the antivirus (AV) scan 506 is run on all files. At 512, FS metadata content of the current snapshot (516) is compared with FS metadata of previous snapshot (514) to find which files have changed. At 516, the AV scan is run only on the changed files.

The various actions, acts, blocks, steps, or the like as described above may be performed in the order presented, in a different order or simultaneously. Further, in some embodiments, some of the actions, acts, blocks, steps, or the like may be omitted, added, modified, skipped, or the like without departing from the scope of the invention.

Various advantages of the disclosed method and system exist. The disclosed method and system provide for lesser time in performing the antivirus scan, as the virtual machine is not mounted during the first screening on the file system for performing the antivirus scan. As a result, the process is more time efficient and consumes lesser computing and network resources.

Figure 6:
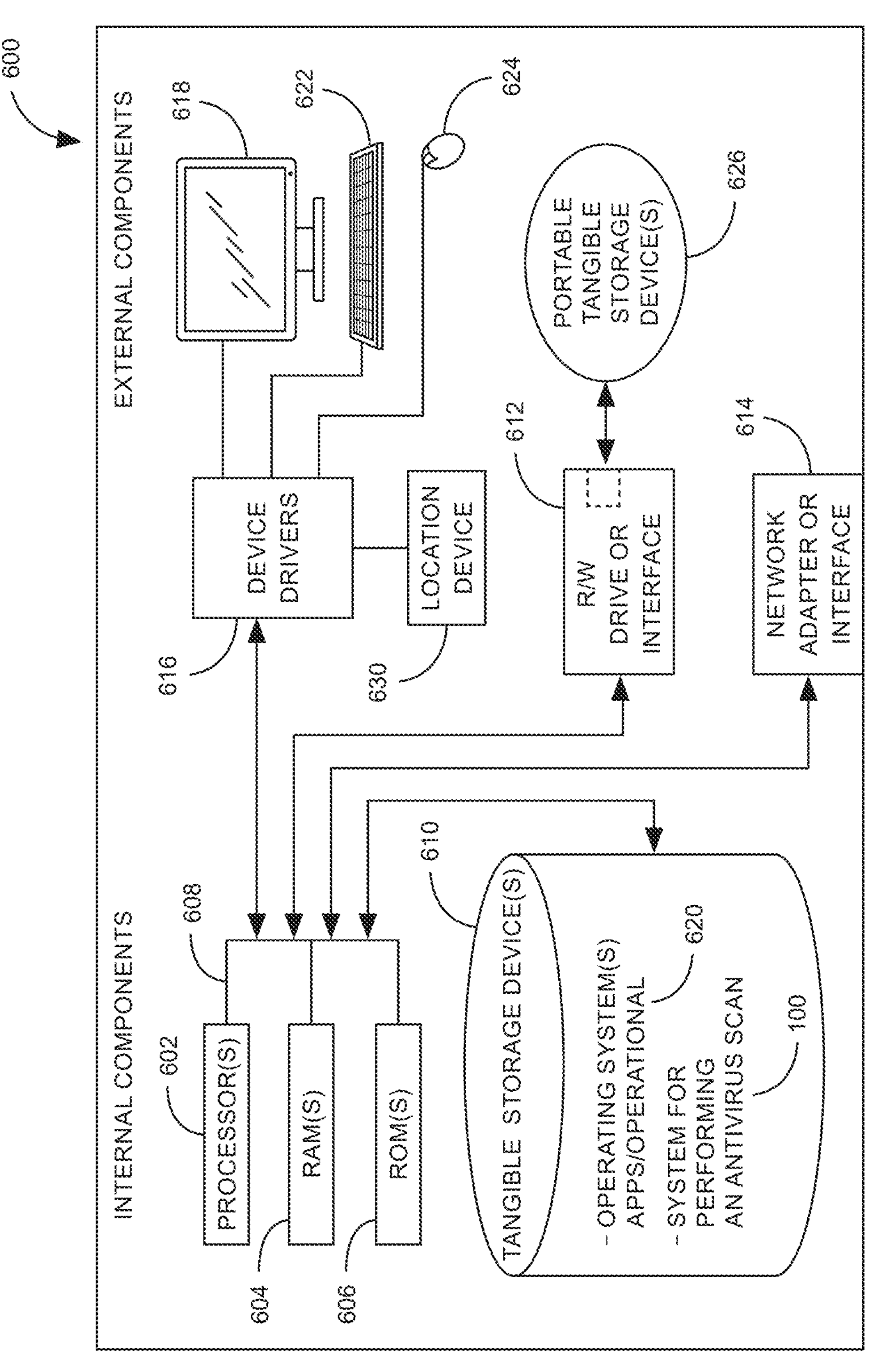
FIG. 6 is a block diagram of an embodiment of a computing device in which the modules of the system for performing an antivirus scan of a virtual machine, described herein, are implemented.

The modules of the system (100) for performing antivirus scan on a virtual machine, described herein are implemented in computing devices. One example of a computing device (600) is described below in FIG. 6. The computing device (600) includes one or more processor(s) (602), one or more computer-readable RAMs (604) and one or more computer-readable ROMs (606) on one or more buses (608). Further, computing device (600) includes a tangible storage device (610) that may be used to execute operating systems (620) and the online platform system (100). The various modules of the online review system (100) may be stored in the tangible storage device (610). Both, the operating systems (620) and the online platform system (100) are executed by the one or more processor(s) (602) via one or more respective RAMs (604) (which typically include cache memory). The execution of the operating systems (620) and/or the online platform system (100) by the one or more processor(s) (602), configures the one or more processor(s) (602) as a special purpose processor configured to carry out the functionalities of the operation systems (620) and/or the online platform system (100) as described above.

Examples of the tangible storage device (610) include semiconductor storage devices such as ROM, EPROM, flash memory or any other computer-readable tangible storage device that may store a computer program and digital information.

Computing device (600) also includes a R/W drive or interface (614) to read from and write to one or more portable computer-readable tangible storage devices (628) such as a CD-ROM, DVD, memory stick or semiconductor storage device. Further, network adapters or interfaces (612) such as a TCP/IP adapter cards, wireless Wi-Fi interface cards, or 3G or 4G wireless interface cards or other wired or wireless communication links are also included in computing device.

In one example embodiment, the online platform system (100) may be stored in the tangible storage device (610) and may be downloaded from an external computer via a network (for example, the Internet, a local area network or other, wide area network) and network adapter or interface (612).

Computing device (500) further includes device drivers (616) to interface with input and output devices. The input and output devices may include a computer display monitor (618), a keyboard (622), a keypad, a touch screen, a computer mouse (624), and/or some other suitable input device.

In this description, including the definitions mentioned earlier, the term 'module' may be replaced with the term 'circuit.' The term 'module' may refer to, be part of, or include processor hardware (shared, dedicated, or group) that executes code and memory hardware (shared, dedicated, or group) that stores code executed by the processor hardware. The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above. Shared memory hardware encompasses a single memory device that stores some or all code from multiple modules. Group memory hardware encompasses a memory device that, in combination with other memory devices, stores some or all code from one or more modules.

In some embodiments, the module may include one or more interface circuits. In some examples, the interface circuits may include wired or wireless interfaces that are connected to a local area network (LAN), the Internet, a wide area network (WAN), or combinations thereof. The functionality of any given module of the present description may be distributed among multiple modules that are connected via interface circuits. For example, multiple modules may allow load balancing. In a further example, a server (also known as remote, or cloud) module may accomplish some functionality on behalf of a client module.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The aforementioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The example embodiment or each example embodiment should not be understood as a limiting/restrictive of inventive concepts. Rather, numerous variations and modifications are possible in the context of the present disclosure, in particular those variants and combinations which may be inferred by the person skilled in the art with regard to achieving the object for example by combination or modification of individual features or elements or method steps that are described in connection with the general or specific part of the description and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure.

Still further, any one of the above-described and other example features of example embodiments may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one example embodiment relates to a non-transitory computer-readable storage medium comprising electronically readable control information (e.g., computer-readable instructions) stored thereon, configured such that when the storage medium is used in a controller of a magnetic resonance device, at least one example embodiment of the method is carried out.

Even further, any of the aforementioned methods may be embodied in the form of a program. The program may be stored on a non-transitory computer readable medium, such that when run on a computer device (e.g., a processor), cause the computer-device to perform any one of the aforementioned methods. Thus, the non-transitory, tangible computer readable medium is adapted to store information and is adapted to interact with a data processing facility or computer device to execute the program of any of the above-mentioned embodiments and/or to perform the method of any of the above-mentioned embodiments.

The computer readable medium or storage medium may be a built-in medium installed inside a computer device main body or a removable medium arranged so that it may be separated from the computer device main body. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The apparatuses and methods described in this application may be partially or fully implemented by a special purpose computer created by configuring a general-purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

What is claimed is:

1. A system for performing an antivirus scan of a virtual machine, the system comprising:

a memory storing one or more processor-executable routines; and a processor communicatively coupled to the memory, the processor configured to execute the one or more processor-executable routines to:

access a plurality of backup snapshots of the virtual machine;

perform a complete antivirus scan of one or more snapshots to identify a reference snapshot, wherein the reference snapshot comprises one or more first malicious files;

compare file system metadata of a first snapshot with respective file system metadata of the reference snapshot to identify files that have changed between the first and reference snapshots;

perform the antivirus scan of the identified changed files to detect one or more second malicious files and to generate a list of the first and second malicious files;

access a second snapshot and the list of malicious files with corresponding metadata of the files;

perform first, second and third screenings of the second snapshot to detect infected snapshots, wherein the first, second and third screenings comprise comparing disk offsets and checksums of corresponding data at the disk offsets, metadata, and file checksums, respectively, of the first and second malicious files with corresponding files of the second snapshot, wherein the first, second and third screenings are performed in a sequential manner, and repeat the first, second and third screenings for the plurality of backup snapshots of the virtual machine.

2. The system of claim 1, wherein the processor is configured to access the plurality of backup snapshots of the virtual machine hosted on a disk.

3. The system of claim 1, wherein the processor is further configured to access metadata of the files corresponding to the reference snapshot.

4. The system of claim 1, wherein the updated malicious files list is stored using the memory.

5. The system of claim 1, wherein the processor is configured to screen a disk of the virtual machine to perform the antivirus scan.

6. The system of claim 1, wherein the processor is further configured to:

perform the first screening of the plurality of backup snapshots, wherein the processor is configured to compare the disk offsets and checksum of corresponding data at the disk offsets of the first and second malicious files; and mark the second snapshot as being infected with a malicious file if a match is detected.

7. The system of claim 6, wherein the processor is further configured to:

perform the second screening of the subsequent backup snapshots if the second backup snapshot is detected to be uninfected with the malicious file in the first screening, wherein the processor is configured to compare the metadata of the identified malicious files with respective files of the second backup snapshot;

mark the second backup snapshot as being infected with the malicious file, if a match is detected between the metadata of the corresponding files; and perform the third screening of the subsequent backup snapshots if the second backup snapshot is detected to be uninfected with the malicious file in the second screening, wherein the processor is configured to compare the file checksum of the identified malicious files with respective files of the second backup snapshot.

8. The system of claim 7, wherein the processor is configured to mount a file system of a disk and compare the metadata and file checksum respectively to perform the second and third screenings.

9. The system of claim 1, wherein the processor is further configured to:

access metadata corresponding to two consecutive backup snapshots;

compare the metadata corresponding to the two consecutive backup snapshots to identify one or more files that have changed between the two snapshots; and scan the identified one or more files to identify one or more malicious files.

10. A system for performing an antivirus scan of a virtual machine, the system comprising:

a memory storing one or more processor-executable routines; and a processor communicatively coupled to the memory, the processor configured to execute the one or more processor-executable routines to:

access a plurality of backup snapshots of the virtual machine;

access a current snapshot and a list of malicious files with corresponding metadata of the files;

perform first, second and third screenings of the current snapshot to detect an infected snapshot, wherein the first, second and third screenings comprise comparing disk offsets and checksums of corresponding data at the disk offsets, metadata, and file checksums, respectively, of the malicious files with corresponding files of the current snapshot, wherein the first, second and third screenings are performed in a sequential manner, and repeat the first, second and third screenings for the plurality of backup snapshots of the virtual machine.

11. The system of claim 10, wherein the processor is further configured to execute the one or more processor-executable routines to:

perform a complete antivirus scan of one or more snapshots to identify a reference snapshot, wherein the reference snapshot comprises one or more malicious files;

compare file system metadata of a first snapshot with respective file system metadata of the reference snapshot to identify files that have changed between the first and reference snapshots; and perform the antivirus scan of the identified changed files to detect one or more malicious files and to generate an updated list of the malicious files.

12. The system of claim 11, wherein the processor is further configured to perform a fourth screening of two consecutive backup snapshots, wherein metadata corresponding to two consecutive backup snapshots are compared in the fourth screening to identify one or more files that have changed between the two snapshots; and wherein the identified one or more files are scanned to identify one or more malicious files.

13. The system of claim 12, wherein the processor is further configured to repeat the first, second, third and fourth screenings for the plurality of backup snapshots of the virtual machine.

14. The system of claim 10, wherein the processor is configured to mount a file system of a disk and compare the metadata and file checksum, respectively, corresponding to the first and second backup snapshots to perform the second and third screenings.

15. The system of claim 10, wherein the system is configured to reduce a number of full antivirus scans of the backup snapshots to determine the malicious files.

16. A method of performing an antivirus scan of a virtual machine, the method comprising:

accessing a plurality of backup snapshots of the virtual machine;

performing a complete antivirus scan of one or more snapshots to identify a reference snapshot, wherein the reference snapshot comprises one or more first malicious files;

comparing file system metadata of a first snapshot with respective file system metadata of the reference snapshot to identify files that have changed between the first and reference snapshots;

performing the antivirus scan of the identified changed files to detect one or more second malicious files and to generate a list of the first and second malicious files;

accessing a second snapshot and the list of malicious files with corresponding metadata of the files;

performing first, second and third screenings of the second snapshot to detect an infected snapshot, wherein the first, second and third screenings comprise comparing disk offsets and checksums of corresponding data at the disk offsets, metadata, and file checksums, respectively, of the first and second malicious files with corresponding files of the second snapshot, wherein the first, second and third screenings are performed in a sequential manner, and repeating the first, second and third screenings for the plurality of backup snapshots of the virtual machine.

17. The method of claim 16, further comprising screening a disk of the virtual machine to perform the antivirus scan.

18. The method of claim 17, further comprising:

performing the first screening of the plurality of backup snapshots, wherein the screening comprises comparing the disk offsets and checksum of corresponding data at the disk offsets of the first and second malicious files; and marking the second snapshot as being infected with a malicious file if a match is detected.

19. The method of claim 18, further comprising:

performing the second screening of the subsequent backup snapshots if the second backup snapshot is detected to be uninfected with the malicious file in the first screening, wherein the screening comprises comparing the metadata of the identified malicious files with respective files of the second backup snapshot; and marking the second backup snapshot as being infected with the malicious file, if a match is detected between the metadata of the corresponding files.

20. The method of claim 19, further comprising performing the third screening of the subsequent backup snapshots if the second backup snapshot is detected to be uninfected with the malicious file in the second screening, wherein the processor is configured to compare the file checksum of the identified malicious files with respective files of the second backup.

* * * * *